United States Patent [19]

Suzuki et al.

[11] Patent Number: 4,847,887
[45] Date of Patent: Jul. 11, 1989

[54] TELEPHONE SYSTEM IN A VEHICLE

[75] Inventors: Katsuo Suzuki; Kazuyuki Umebayashi, both of Tokyo, Japan

[73] Assignee: Aisin Seiki Kabushiki Kaisha, Aichi, Japan

[21] Appl. No.: 171,076

[22] Filed: Mar. 21, 1988

[30] Foreign Application Priority Data

Mar. 21, 1987 [JP] Japan ................. 62-067419

[51] Int. Cl.⁴ ............................... H01M 1/23
[52] U.S. Cl. ........................ 379/58; 455/90; 358/63
[58] Field of Search ............. 455/90, 89; 379/56, 379/58, 59, 63

[56] References Cited

U.S. PATENT DOCUMENTS

| | | | |
|---|---|---|---|
| 4,241,236 | 12/1980 | Nash | 379/56 |
| 4,455,454 | 6/1984 | Umebayashi | 379/63 |
| 4,490,584 | 12/1984 | Lucey | 379/56 |
| 4,629,828 | 12/1986 | Umebayashi | 379/56 |
| 4,646,344 | 2/1987 | Goldhorn et al. | 379/58 |
| 4,669,108 | 5/1987 | Deinzer | 379/61 |
| 4,677,722 | 3/1987 | Nishida et al. | 379/63 |
| 4,698,838 | 10/1987 | Ishikawa et al. | 379/58 |
| 4,723,265 | 2/1988 | Kamei et al. | 379/58 |
| 4,736,410 | 4/1988 | Nishida et al. | 379/354 |
| 4,741,018 | 4/1988 | Potratz et al. | 379/58 |
| 4,747,122 | 5/1988 | Bhagat et al. | 379/57 |

Primary Examiner—Robert Lev
Attorney, Agent, or Firm—Sughrue, Mion, Zinn, Macpeak & Seas

[57] ABSTRACT

A telephone system in the vehicle comprises a detectable handset including a microphone and speakers, a pad positioned near a vehicle driver for holding the detachable handset, amplifiers for amplifying a voice signal from the microphone, a position detector for detecting a distance between the handset and the pad, and a gain controller for controlling the gain of the amplifiers in response to the distance detected by the position detector. When the handset is held on the pad, the position detector detects that the handset is positioned adjacent the pad. At this time, the gain controller increases the gain of the amplifiers, and consequently, the voice from the vehicle driver is clearly received. Therefore, a vehicle passenger especially the driver, can use the telephone system while grasping a steering wheel with both hands. When the handset is removed from the pad, the position detector detects that the hand set is positioned remote from the pad. At this time, the gain controller decreases the gain of the amplifiers, and consequently, a vehicle passenger other than the driver can use the telephone system in the same manner as a telephone system in a home.

5 Claims, 4 Drawing Sheets

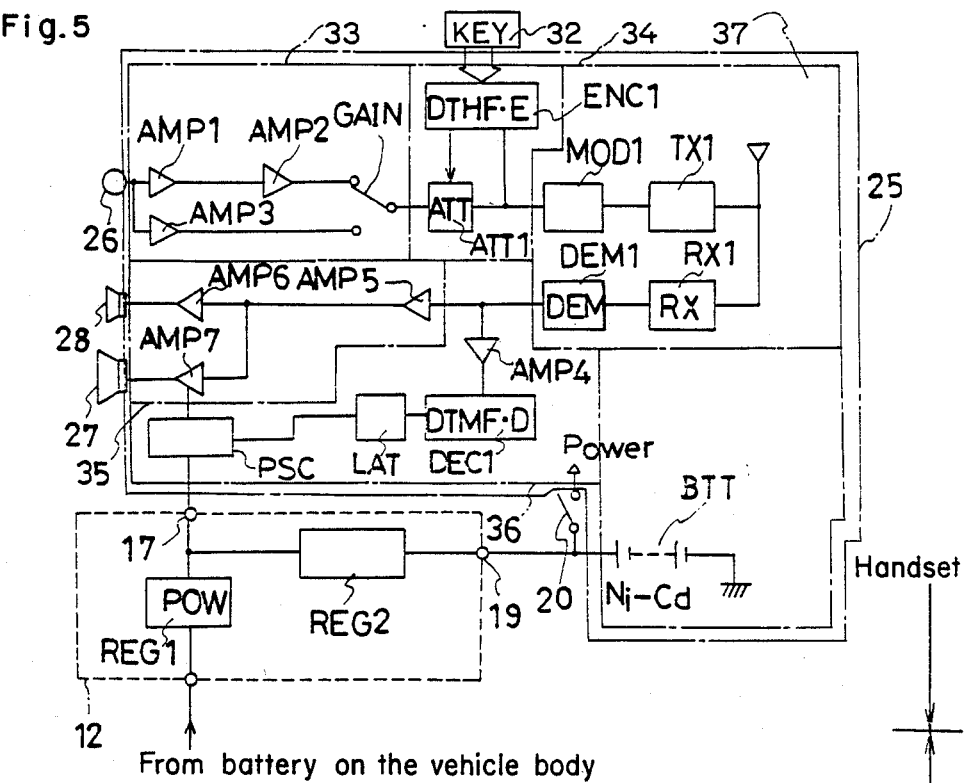
Fig. 5
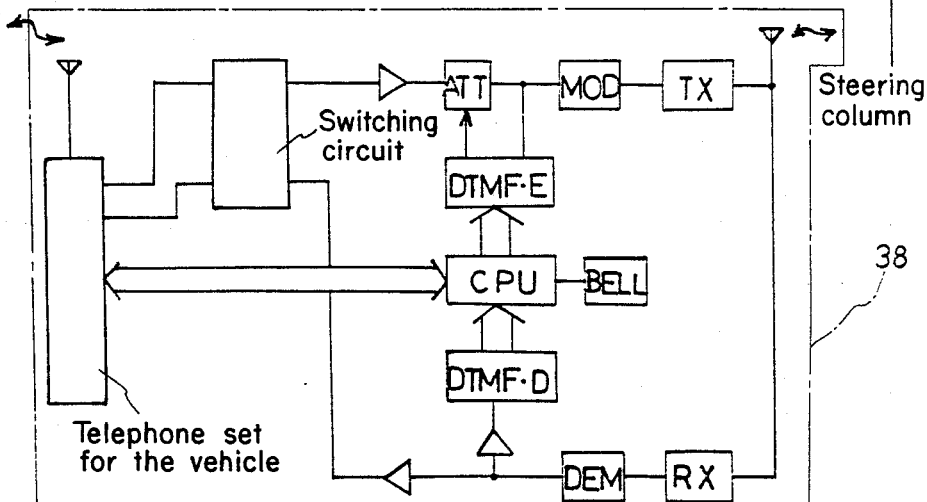

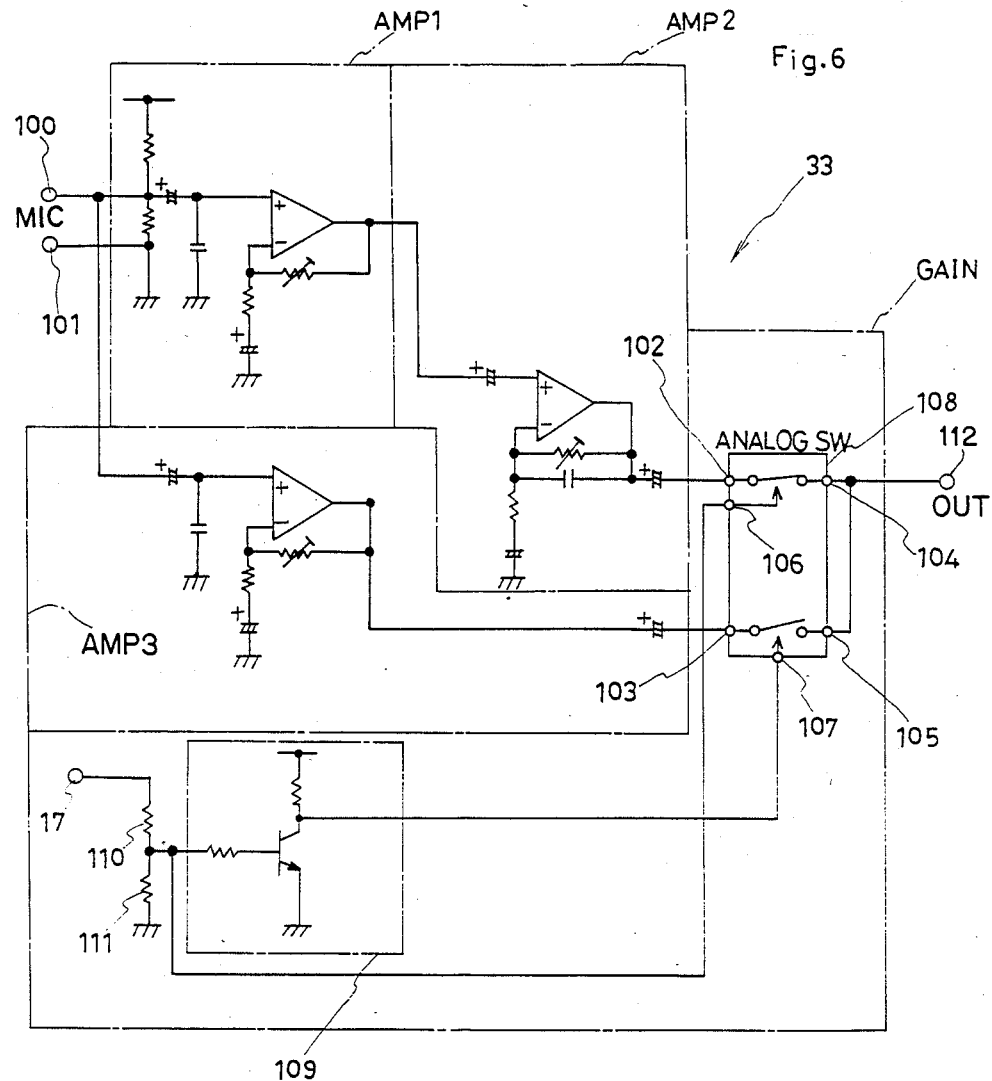

(54) TELEPHONE SYSTEM IN A VEHICLE

BACKGROUND OF THE INVENTION

This invention relates to a telephone system in a vehicle, and more particularly, relates to a telephone system including a detachable handset.

Recently, the demand for providing a telephone system in a vehicle increased with the development of radio communication networks. However, telephone equipment as used in a home was being used for the telephone system in a vehicle. However, such conventional telephone equipment was not considered suitable for the uniqueness of a vehicle.

The telephone system in the vehicle becomes inconvenient for a vehicle driver if the driver cannot use the telephone system while the driver is driving the vehicle. Furthermore, the telephone system in the vehicle becomes inconvenient for vehicle passengers except for the driver, if the passengers cannot use the telephone system in the same manner in which they use the telephone system in their home.

Accordingly, it is preferable for the vehicle driver to execute "on-hook talking" which enables the driver to grasp a steering wheel with both hands. Further, it is preferable for the vehicle passengers, except for the driver, to execute "off-hook talking" that enables them to use the telephone system in the vehicle in the same manner as the telephone system in the home. A talker's voice should be picked up clearly over noises in the vehicle compartment in order to carry out "on-hook talking".

A telephone system capable of both "on-hook talking" and "off-hook talking" is disclosed in Japanese laid-open patent publication No. 82540/1986 published on Apr. 26, 1986. This telephone system includes two microphones and two speakers. The microphone for "on-hook talking" has a keen directivity in order to pick up the talker's voice clearly.

However, the use of two microphones increases the cost of a telephone system because the number of the parts is increased. Furthermore, the use of two microphones makes the electronic circuit complicated because an electronic circuit is required to select and process voice signals from the two microphones. Thus, two microphones are not preferable for a telephone system in a vehicle.

A telephone system capable of "on-hook talking" is disclosed in Japanese laid-open patent publication No. 141838/1980 published on Nov. 6, 1980. This telephone system positions a microphone close to the driver's mouth in order to pick up the driver's voice clearly during "on-hook talking".

However, if the microphone is positioned near the vehicle driver who wants to talk, the driver feels an unpleasantness from the closeness of the microphone. Especially, when the driver wants to talk, the driver may not be able to concentrate on driving because the microphone may disturb the driver's sight.

SUMMARY OF THE INVENTION

Accordingly, it is an object of the present invention to obviate the above-mentioned conventional drawbacks.

Further, it is an object of the present invention to execute both "on-hook talking" and "off-hook talking" with a common single microphone.

Furthermore, it is an object of the present invention to remove a microphone which is remote from a talker's mouth during "on-hook talking".

To achieve the above objects, the telephone system in the vehicle according to the present invention comprises a detachable handset including a microphone and a speaker, a holding means positioned near the driver for h holding the detachable handset, amplifying means for amplifying a voice signal from the microphone, position detecting means for detecting the distance between the handset and the holding means, and, gain controlling means for increasing the gain of the amplifying means in response to the distance detected by the position detecting means.

When "on-hook talking" is going to be executed by the telephone system, the position detecting means detects that the handset is held by the holding means, i.e. the microphone is positioned remotely from the talker's mouth. Therefore, the level of the voice signal detected by the microphone is relatively small. Accordingly, in the present invention, when the handset is positioned on or near the holding means, the gain controlling means increases the gain of the amplifying means.

Further, when "off-hook talking" is going to be executed, the position detecting means detects that the handset is remove from the holding means, i.e. the microphone is positioned close to the talker's mouth. Therefore, the level of the voice signal detected by the microphone is relatively large. Accordingly, in the present invention, when the handset is remotely positioned from the holding means, the gain controlling means decreases the gain of the amplifying means.

Accordingly, in the present invention, both "on-hook talking" and "off-hook talking" can be carried out with the common single microphone and the microphone can be positioned remotely from the driver's mouth during "on-hook talking".

Further objects and features of the present invention will be apparent from the following description referring to the accompanying figures.

BRIEF DESCRIPTION OF THE DRAWINGS

FIG. 5 is a circuit diagram for a handset of the present invention.

FIG. 6 is a circuit diagram of the microphone amplifier of the present invention.

DESCRIPTION OF THE PREFERRED EMBODIMENT

Figure 1:
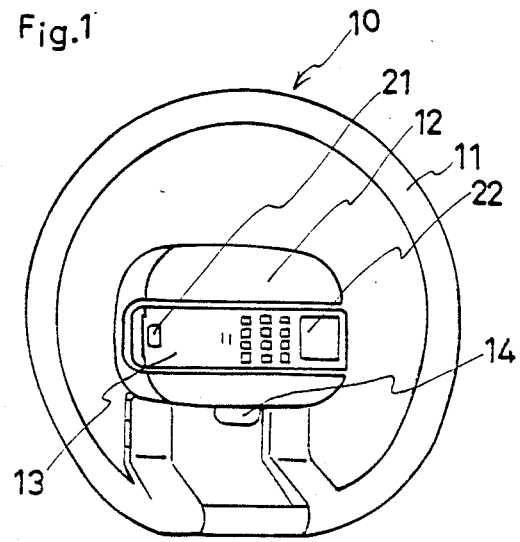
FIG. 1 is a perspective view of a telephone system on a vehicle according to the present invention.

FIG. 1 is a perspective view of a telephone system on a vehicle according to a preferred embodiment of the present invention. A steering wheel 10 comprises a ring 11 and a central pad 12 having a groove with removable handset 13 therein. In this embodiment, the handset 13 may be removed from the groove in the pad 12 by pushing an eject switch 14.

In the telephone system according to this embodiment, "on-hook talking" is executed when the handset 13 is mounted on the pad 12 which enables a vehicle passenger to talk while driving the vehicle. That is to say, when the driver wishes to use the telephone system, the driver is able to use the telephone system while grasping the steering wheel 10 with both hands by mounting the handset 13 on the pad 12.

Further, in the telephone system a according to this preferred embodiment, "off-hook talking" is executed when the handset 13 is removed from the pad 12, which enables a vehicle passenger use the telephone in the same manner as at home. That is to say, when a vehicle passenger wishes to use the telephone system, the passenger is able to use the telephone system in the same manner as a conventional telephone system in a home by removing the handset 13 from the pad 12.

Figure 2:
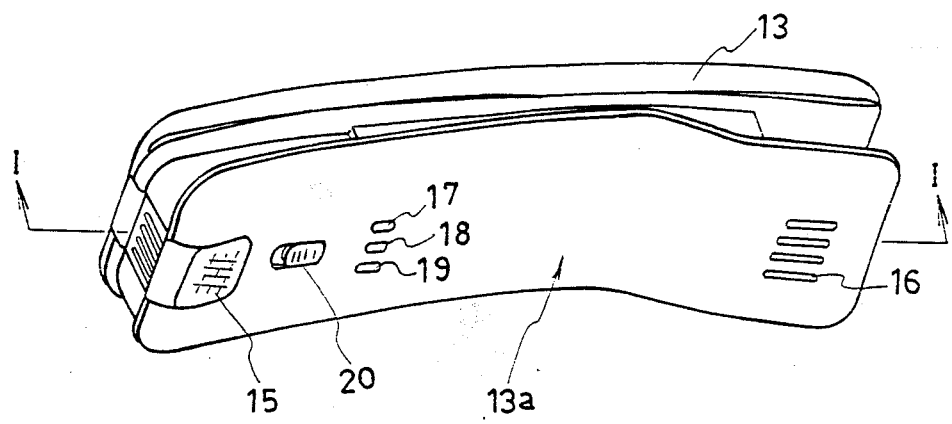
FIG. 2 is a rear perspective view of a handset according to the present invention.

FIG. 2 shows a rear perspective view of the handset 13. Microphone holes 15 for "off-hook talking" and speaker holes 16 for "off-hook talking" are provided on the rear surface 13a of the handset 13. Further, a power switch 20 is disposed on the rear surface 13a. The power switch 20 connects and electronic circuit 25 contained in the handset 13 to a rechargeable battery BTT selectively in order to conserve the electric power of the battery BTT in the detached handset 13. Furthermore, contacts 17, 18, 19 are provided on the rear surface 13a. The contacts 17, 18, 19 receive electric power from corresponding contacts (not shown) provided on the pad 12 of the steering wheel 10. The contact 17 receives electric power for executing "on-hook talking" with the handset on the pad 12. The contact 19 receives electric power for charging the battery BTT contained in the handset 13. The contact 18 is a common ground for both contacts 17 and 19. Accordingly, when the handset 13 is mounted on the pad 12, electric power is supplied from the vehicle battery through the pad 12 to the handset 13, through the contacts 17, 18, 19. When the handset 13 is mounted on the pad 12, the battery BTT is charged and an amplifier is enabled for operation.

Figure 3:
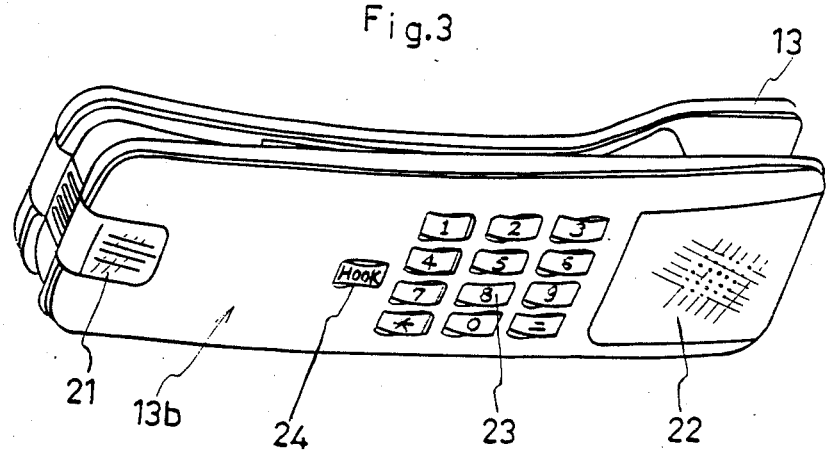
FIG. 3 is a front perspective view of a handset according to the present invention.

FIG. 3 shows a front perspective view of the handset 13. Microphone holes 21 and speaker holes 22 are provided on the front surface 13b of the handset 13. Additionally, push buttons 23 and a hook switch 24 are provided on the front surface 13b of the handset 13. The push buttons 23 are utilized for dialling a telephone number. The hook switch 24 is utilized for connecting the telephone system to a public telephone circuit.

Figure 4:
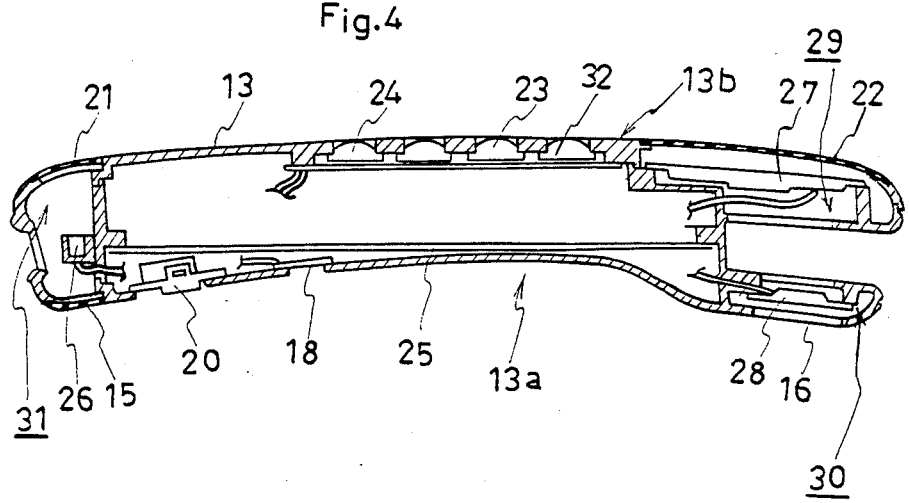
FIG. 4 is a cross sectional view taken along line I—I in Fig 2.

FIG. 4 is a cross sectional view of the handset 13 along the line I—I in FIG. 2. At one end of the handset 13, a speaker 27 for "on-hook talking" and a speaker 28 for "off-hook talking" are provided. The speaker 27 emits sound in a direction opposite to the direction of sound from the speaker 28. That is to say, the speaker 27 for "on-hook talking" is contained in the speaker box 29 which includes the speaker holes 22 in order to emit the sound or voice toward the front surface 13b of the handset 13. The speaker 28 for "off-hook talking" is contained in the speaker box 30 which includes the speaker holes 16 in order to emit the sound or voice toward the rear surface 13a of the handset 13.

At the other end of the handset 13, a microphone 26 is provided. A microphone 26 is utilized commonly for both "on-hook talking" and "off-hook talking". The microphone 26 is contained in the microphone box 31 which includes the microphone holes 15 for the "off-hook talking" and the microphone holes 21 for the "on-hook talking". The microphone holes 15 and 21 are provided on opposite sides of the handset, respectively.

The microphone 26 in this embodiment is a unidirectional microphone having a keen directivity. The directivity of the microphone 26 is pointed toward the microphone holes 21 which are used in "on-hook talking". In other words, the microphone 26 is more sensitive to a voice coming through the microphone holes 21 for "on-hook talking" than a voice coming through the microphone holes 15 for "off-hook talking".

the electronic circuit 25 is disposed in the handset 13. The push buttons 23 and the hook switch 24 is fixed to the same key board 32.

FIG. 5 shows the circuit diagram in the handset 13. The key board 32, the speakers 27, 28, microphone 26 and the power switch 20 are electrically connected to the electronic circuit 25 by conductive wires. The electronic circuit 25 comprises a microphone amplifier 33, dialler 34, a speaker driver 35, an on-hook talking controller 36, a transmitting and receiving circuit 37 and a rechargeable battery BTT.

The microphone amplifier 33 is connected to an input terminal of the transmitting and receiving circuit 37 through the dialler 34. The speaker driver 35 and the on-hook talking controller 36 are connected to an output terminal fo the transmitting and receiving circuit 37.

The voice signal generated by the microphone 26 is applied to the dialler 34 after amplification by the microphone amplifier 33.

Referring now to FIG. 5, the microphone amplifier 33 is explained. The microphone 26 is connected to terminals 100, 101. Both amplifiers AMP1 and AMP3 are connected to the terminal 100. In this embodiment, gain of the amplifier AMP1 is equalized with gain of amplifier AMP3 by adjusting. Detailed explanations for the amplifiers AMP1 and AMP3 are omitted from the present specification because the amplifiers AMP1 and AMP3 are well known circuits in the art.

An amplifier AMP2 is connected to the amplifier AMP1. Gain of the amplifier AMP2 is established to be greater than 1 by adjusting means. In other words, the output voltage from the amplifier AMP2 is always larger than the input voltage applied to the amplifier AMP2. A detailed explanation for the amplifier AMP2 is also omitted because the amplifier AMP2 is a well known circuit in the art.

The voice signal generated by the microphone 26 is amplified by two different channels at the same time. One channel includes the amplifiers AMP1, AMP2 and the other channel includes the amplifier AMP3. However, the channel including the amplifiers AMP1, AMP2 amplifies the voice signal greater than he channel including the amplifier AMP3. The channel including the amplifier AMP1, AMP2 has a greater gain than the channel including the amplifier AMP3.

The amplifiers AMP2 and AMP3 are connected to a gain selector GAIN. The gain selector GAIN comprises an analog switch 108 and an inverter 109. Output signal from the amplifier AMP2 is applied to a terminal 102 of the analog switch 108. The ouput signal of the amplifier AMP3 is applied to a terminal 103 of the analog switch 108.

Both terminals 104, 105 of the analog switch 108 are connected to a terminal 112. The terminal 112 is connected to the dialler 34. The analog switch 108 comprises two switching element which turn on an doff in response to the signal applied to the terminals 106, 107. One of the switching elements connects the terminal 102 to the terminal 104 selectively in response to a signal applied to the terminal 106, and the other of the switching elements connects the terminal 103 to the terminal 105 selectively in response to a signal applied to the terminal 107.

the terminal 106 of the analog switch 108 is connected to the contact 17 through a resistor 100 and is grounded through a resistor 111. The terminal 107 of the analog switch 108 is connected to inverter 109. An input terminal of the inverter 109 is connected to the contact 17 through a resistor 110 and is grounded through the resistor 111 as is the terminal 106 of the analog switch 108.

Accordingly, voltage on the terminal 106 of the analog switch 108 and voltage on the input terminal of the inverter 109 are substantially equal to voltage supplied by the power supply when the handset 13 is mounted on the pad 12. The electric power is supplied to the contact 17 through the pad 12. Both the voltage on the terminal 106 and the input terminal of the inverter 109 become grounded when the handset 13 is received from the pad 12.

The analog switch 108 connects the terminal 102 to the terminal 104 when the handset 13 is mounted to the pad 12. The analog switch 108 connects the terminal 103 to the terminal 105 when the handset 13 is removed from the pad 12.

The gain of microphone amplifier 33 can be controlled by the analog switch 108 for selecting the two independent channels.

Referring again to FIG. 5, the dialler 34 is explained. The dialler circuit 34 is a circuit for converting a telephone number into a Dual Tone Multi-Frequency DTMF signal. The dialler 34 comprises a DTMF encoder ENC1 and a attenuator ATT1. When the push buttons 23 are operated, the dialler 34 attenuates the voice signal from the mirophone amplifier 33, and instead of the voice signal, the dialler applies the DTMF signal in accordance with the operation fo the push buttons 23 to the transmitting and receiving circuit 37. When the push buttons 23 are not operated, the dialler 34 supplies the voice signal from the microphone amplifier 33 to the transmitting and receiving circuit 37.

The transmitting and receiving circuit 37 comprises a modulator MOD1, a transmitter TX1, a demodulator circuit DEM1, a receiver RX1 and an antenna ANT1. The modulator MOD1 and transmitter TX1 convert the voice signal from the dialler 34 into an electric wave. The demodulator DEM1 and receiver RX1 convert an electric wave from the telephone controller 38 into the voice signal which is supplied to the speaker driver 35 and the on-hook talking controller 36. The frequency of electric wave transmitted by the transmitter TX1 is different from the frequency of the electric wave received by the receiver RX1. Accordingly, the transmitting and receiving circuit 37 is able to transmit and r receive the electric waves at the same time without mutual interferences.

The voice signal from the dialler 34 is converted into an electric wave by the transmitting and receiving circuit 37. Then, the electric wave is transmitted to the telephone controller 38 through the antenna ANT1.

Meanwhile, the electric wave from the telephone controller 38 is converted into the voice signal by the transmitting and receiving circuit 37. The voice signal converted by the transmitting and receiving circuit 37 is supplied to the speaker driver 35 and the on-hook talking controller 36.

The speaker driver 35 comprises three amplifiers AMP5, AMP6, AMP7. The speaker 28 for the "off-hook talking" is connected to the amplifier AMP6. The speaker 27 for the "on-hook talking" is connected to the amplifier AMP7. The amplifier AMP6 amplifies the voice signal from the amplifier AMP5 and then drives the speaker 28 for the "off-hook talking". The amplifier AMP7 amplifies the voice signal from the amplifier AMP5 and then drives the speaker 27 for the "on-hook talking".

The amplifiers AMP6, AMP7 are supplied with electric power by different power supplies. The amplifier AMP6 is supplied with electric power from the battery BTT. The amplifier AMP7 is supplied with electric power from the velude battery through the contact 17. Accordingly, if the handset 13 is removed from the pad 12, the amplifier AMP7 cannot operate.

The on-hook talking controlling circuit 36 comprises an amplifier AMP4, a DTMF decoder DEC1, a bi-stable latch LAT and a power supply controller PSC. When a predetermined signal is received from the telephone controller 38, the on-hook talking controller 36 decodes the signal by the decoder DEC1 and memorizes the decoded signal on the bi-stable latch LAT. The latch LAT of the present embodiment is able to memorize 1-bit of binary signal. The power supply controller PSC is connected to the bi-stable latch LAT.

The power supply controller PSC is a switching circuit interposed between the contact 17 and the amplifier AMP7. The power supply controller PSC controls the power supply from the vehicle battery to the amplifier AMP7. Accordingly, the operation of the amplifier AMP7 is determined by the condition of the bi-stable latch LAT.

Meanwhile, a regulated power supply REG1 and an excessive charging prevention circuit REG2 are contained in the pad 12. The regulated power supply REG1 is connected to the battery (not shown) mounted on the vehicle body. Further, the excessive charging preventing circuit REG2 is interposed between the regulated power supply REG1 and contact 19. The contact 19 is connected to the power switch 20 and rechargeable battery BTT respectively. The battery BTT is charged while the handset 13 is mounted on the pad 12 through the contact 19.

The operation of the electronic circuit 25 is explained as follows. When the telephone system on the vehicle is called by a telephone system out of the vehicle, i.e. when a bell contained in the telephone controller 38 rings, the hook switch 24 is operated by a vehicle passenger in order to connect the telephone system to the public telephone circuit. The hook switch 24 is also operated by the vehicle passenger when the passenger wishes to use the telephone system.

When the hook switch 24 is operated, the DTMF signal corresponding to the operation of the hook switch 24 is generated by the dialler 34. Then the operation of the hook switch 24 is converted into an electric wave by the transmitting and receiving circuit 37 and is transmitted to the telephone controller 38.

When the operation of the hook switch 24 is transmitted to the telephone controller 38, the telephone controller 38 transmits the predetermined signal to the handset 13. Then, if the handset 13 is mounted on the pad 12, the on-hook tallking controller 36 is operated and the amplifier AMP7 is enabled for operation.

When the operation of the hook switch 24 is transmitted to the telephone controller 38, the telephone controller 38 connects the handset 13 to a public telephone circuit. At this time, the telephone system on the vehicle executes "on-hook talking".

Thus, when the handset 13 is mounted on the pad 12, the amplifier AMP7 is operated in response to the operation of the on-hook talking controller 36. Further, the microphone amplifier 33 is established in high gain. The electric power from the pad 12 is supplied to the contact 17. Accordingly, while the handset 13 is mounted on the pad 12, the telephone system according to this embodiment executes "on-hook talking" automatically.

On the other hand, when the handset 13 is removed from the pad 12, the amplifier AMP7 does not operate entirely. The microphone amplifier 33 is established in low gain and the electric power from the pad 12 is not supplied to the contact 17. Accordingly, while the handset 13 is removed from the pad 12, the telephone system according to this embodiment executes "off-hook talking" automatically.

As mentioned above, the telephone system on the vehicle according to this embodiment comprises the detachable handset 13 including a microphone 26 and speakers 27, 28, the pad 12 positioned near the driver for containing the handset 13, the amplifiers AMP1, AMP2, AMP3 for amplifying the voice signal from the microphone 26, the contacts 17, 18 for detecting the distance between the handset 13 and the pad 12, and, the gain selector GAIN for increasing the gain of the amplifiers AMP1, AMP2, AMP3 in response to the distance detected by the contacts 17, 18.

Accordingly, the microphone 26 is utilized commonly for both "on-hook talking" and "off-hook talking". Therefore, the electronic circuit 25 is simplified, and thus, a low cost telephone system is provided.

Further, according to this embodiment, the microphone 26 is able to be positioned remotely from the driver's mouth during "on-hook talking". Therefore, the driver may concentrate the vehicle driving. Even if the vehicle stops rapidly, i.e. if the driver is forced against the steering wheel 10, the driver is safe since the handset 13 is mounted in a recess in the pad 12.

What is claimed is:

1. A telephone system in a vehicle comprising:
   a detachable handset including a microphone and at least one speaker;
   holding means positioned near a driver for holding said detachable handset;
   amplifying means for amplifying a voice signal from said microphone;
   position detecting means for detecting a distance between said handset and said holding means; and
   gain controlling means for increasing a gain of said amplifying means in response to said distance detected by said position detecting means.

2. A telephone system in vehicle according to claim 1, wherein said handset comprises;
   a first speaker for emitting a voice loudly;
   a second speaker for emitting a voice in a whisper; and
   selecting means for selecting one of said first and second speakers.

3. A telephone system in a vehicle according to claim 1, wherein said holding means comprises:
   a steering wheel;
   a pad portion provided on a center of said steering wheel; and
   a groove provided in said pad portion for receiving said handset.

4. A telephone system in a vehicle according to claim 1, wherein said amplifying means comprises:
   a first channel for amplifying said output signal of said microphone with a first gain, and;
   a second channel for amplifying said output signal of said microphone with a second gain.

5. A telephone system in a vehicle according to claim 1, wherein said position detecting means comprises;
   a first contacting means provided on said handset;
   a second contacting means provided on said holding means for contacting said first contacting means and supplying eletcric power to said handset.

* * * * *